US012708588B1

(12) United States Patent
Chen

(10) Patent No.: US 12,708,588 B1
(45) Date of Patent: Aug. 18, 2026

(54) MASSAGE DEVICE

(71) Applicant: UC GLOBAL TRADE INC., Chino, CA (US)

(72) Inventor: Junjun Chen, Shenzhen (CN)

(73) Assignee: UC GLOBAL TRADE INC., Chino, CA (US)

( * ) Notice: Subject to any disclaimer, the term of this patent is extended or adjusted under 35 U.S.C. 154(b) by 0 days.

(21) Appl. No.: 19/243,574

(22) Filed: Jun. 19, 2025

(30) Foreign Application Priority Data

May 22, 2025 (CN) ......................... 202510666821.7

(51) Int. Cl.
*A61H 19/00* (2006.01)
*A61H 23/02* (2006.01)

(52) U.S. Cl.
CPC ............. *A61H 19/44* (2013.01); *A61H 23/02* (2013.01); *A61H 2201/5071* (2013.01)

(58) Field of Classification Search
None
See application file for complete search history.

(56) References Cited

U.S. PATENT DOCUMENTS 5,233,974 A * 8/1993 Senoue ................ A61H 9/0078 601/149
2011/0098613 A1* 4/2011 Thomas .................... B25F 5/02 601/46
2018/0042809 A1* 2/2018 Zipper ................... A61H 19/44

FOREIGN PATENT DOCUMENTS

CN 102935031 B 5/2014
CN 205108304 U 3/2016
CN 106491334 A 3/2017
CN 110960410 A 4/2020
CN 213911253 U 8/2021

OTHER PUBLICATIONS

Oyama, T. G., Oyama, K., & Taguchi, M. (2020). A simple method for production of hydrophilic, rigid, and sterilized multi-layer 3D integrated polydimethylsiloxane microfluidic chips. Lab on a Chip, 20(13), 2354-2363. https://doi.org/10.1039/d0lc00316f (Year: 2020).*

(Continued)

*Primary Examiner* — Charles A Marmor, II
*Assistant Examiner* — Marc D. Honrath
(74) *Attorney, Agent, or Firm* — Ming Jiang; OPENPTO US LLC

(57) ABSTRACT

Disclosed is a massage device, including a main body, a silicone layer, a pressure sensor disposed between the silicone layer and the main body, a controller disposed inside the main body, and a support member disposed between the silicone layer and the pressure sensor; the silicone layer is wrapped around an outer layer of the main body; the support member is attached to a first end portion of the main body, which is a massage end of the massage device; the pressure sensor is connected to the controller; and the support member includes a first end surface and a second end surface arranged opposite each other, an area of the first end surface is larger than an area of the second end surface, the first end surface is in close contact with the silicone layer, and the second end surface is in close contact with the pressure sensor.

17 Claims, 6 Drawing Sheets

(56) References Cited

OTHER PUBLICATIONS

Jafarizadeh, B., Chowdhury, A. H., & Khakpour, I. (2022). Design rules for a wearable micro-fabricated piezo-resistive pressure sensor. Micromachines, 13(6), 838-851. https://doi.org/10.3390/mi13060838 (Year: 2022).*

Sun, S., Wang, Z., & Wang, Y. (2023, Feb. 22). Polymer-Based Sensors. In Encyclopedia. https://encyclopedia.pub/entry/41528 (Year: 2023).*

* cited by examiner

MASSAGE DEVICE

CROSS REFERENCE TO RELATED APPLICATIONS

The present application claims priorities of the Chinese Patent Application No. 2025106668217, filed on May 22, 2025, the content of which is hereby incorporated by reference in entirety.

TECHNICAL FIELD

The present disclosure belongs to the technical field of massage equipment, and relates to a massage device.

BACKGROUND

A massager is a tool that provides massage or stimulation to human muscles, meridians and other body parts through mechanical vibration, current stimulation or other methods.

Structurally, the massager is usually provided with a pressure sensor to detect a pressure applied between a human body and the massager when the massager is used, thereby enabling more precise massage control.

However, studies have identified that the pressure sensor is usually installed at a contact end of the massager that interfaces with the human body, but the pressure sensor can only detect the pressure value in a fixed area, resulting in a limited responsive area. Moreover, when the massager is used by different users, there may be misalignment between the contact end of the massager and an actual contact region of the human body, which may cause variations in the response of the pressure sensor, resulting in inconsistent control responses of the massager among different users, and affecting the user's interaction experience.

SUMMARY

In order to solve the above technical problems, the present disclosure provides a massage device.

The present disclosure provides a massage device, including a main body, where the main body is a rigid structure, and a controller is disposed inside the main body; a silicone layer, where the silicone layer is wrapped around an outer layer of the main body; a pressure sensor, where the pressure sensor is disposed between the silicone layer and the main body, and is attached to a first end portion of the main body; the first end portion of the main body functions as a massage end of the massage device; the pressure sensor is connected to the controller; a support member disposed between the silicone layer and the pressure sensor, the support member includes a first end surface and a second end surface that are arranged opposite each other, an area of the first end surface is larger than an area of the second end surface, the first end surface is in close contact with the silicone layer, the second end surface is in close contact with the pressure sensor, and the support member is configured to transmit a pressure.

Optionally, an area ratio of the first end surface to the second end surface is denoted as K, where K has a value range of 2-8.

Optionally, K has a value range of 2-4.

Optionally, K has a value range of 3-7.

Optionally, the support member has a truncated cone structure; and the first end surface and the second end surface are both circular.

Optionally, the support member has a truncated pyramid structure; and the first end surface and the second end surface are both quadrilateral.

Optionally, the pressure sensor is a patch-type pressure sensor.

Optionally, a shape of the second end surface is the same as a shape of an actual detection area of the patch-type pressure sensor.

Optionally, the area of the second end surface is equal to an area of the actual detection area of the patch-type pressure sensor.

Optionally, a number of the pressure sensors and a number of the support members are N, respectively, where N is a positive integer; and each pressure sensor corresponds to one support member.

Optionally, the N pressure sensors are distributed in an axisymmetric manner at the first end portion of the main body, such that the N support members are brought into sequential contact.

Optionally, a value of the N is 2.

Optionally, the support member is an elastic support member.

Optionally, the support member is a rigid support member.

Optionally, the pressure sensor is an airbag-type pressure sensor; the airbag-type pressure sensor includes a sealed airbag, and an air pressure sensor disposed within the sealed airbag; and the air pressure sensor is connected to the controller.

Optionally, the sealed airbag includes a flexible contact end and a fixed end; and the flexible contact end is connected to the support member, and the fixed end is configured to be fixed to the first end portion of the main body.

Optionally, the sealed airbag includes M sub-chambers, and a number of the air pressure sensors is also M; M is a positive integer; and each sub-chamber is provided with one air pressure sensor, and each air pressure sensor is connected to the controller.

Optionally, the M sub-chambers are arranged in an array.

Optionally, the sealed airbag includes M sub-chambers; and the M sub-chambers are communicated with one another, where M is a positive integer.

Optionally, a value of the Mis 6.

The present disclosure has the following beneficial effects:

The present disclosure provides a massage device, where a support member having different areas at both ends is disposed between the silicone layer and the pressure sensor of the massage device, the first end surface having a large area is in attached to the silicone layer, and the second end surface having a small area is attached to the pressure sensor, such that a physical response area of the pressure sensor is increased, and the pressure sensor can detect pressure applied over a larger area under the mechanical action of the support member, thereby solving the problem of control deviation problem caused by the use deviation of a small number of users in the current massager design, that is, from the perspective of physical contact and response coverage, the configuration in this embodiment increases the pressure contact response area. From the perspective of pressure detection values, since the support member can absorb a portion of the external force energy, such that the pressure sensor can operate with an expanded detection and response range. It can be seen that the massage device provided by this embodiment can enhance the interactive response of the pressure sensor and improve the user experience.

REFERENCE NUMERALS IN THE ACCOMPANYING DRAWINGS

100. massage device; 10. main body; 20. silicone layer; 30. pressure sensor; 301. sealed airbag; 3011. sub-chamber; 3012. flexible contact end; 3013. fixed end; 302. air pressure sensor; 40. controller; and 50. support member.

DETAILED DESCRIPTIONS OF THE EMBODIMENTS

The technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. All the other embodiments obtained by those of ordinary skill in the art based on the embodiments in the present disclosure without creative efforts shall fall within the scope of protection of the present disclosure.

Studies have found that the pressure sensor is usually installed at a contact end of the massager that interfaces with the human body, but the pressure sensor can only detect the pressure value of a fixed area, resulting in a limited responsive area. Moreover, when the massager is used by different users, there may be deviations between the contact end of the massager and an actual contact region of the human body, which may lead to different responses of the pressure sensor, causing different control responses of the massager to the different users, and affecting the user's interaction experience.

Figure 1:
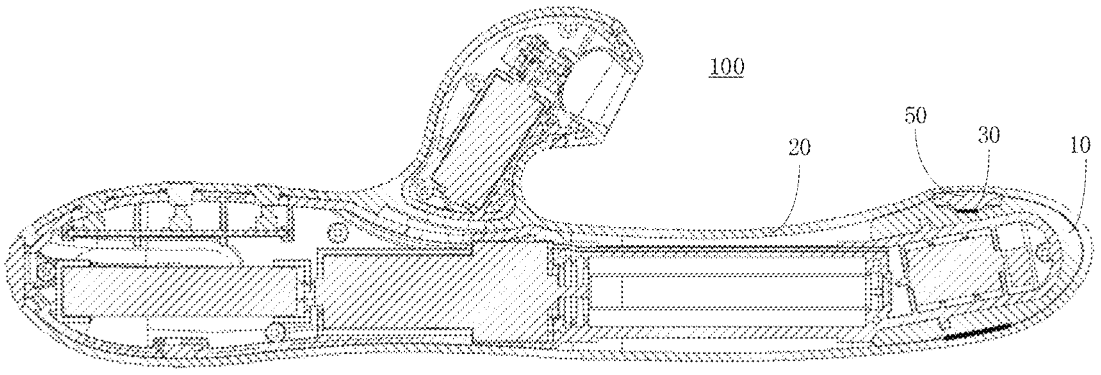
FIG. 1 is a schematic structural diagram of a massage device according to an embodiment of the present disclosure.
Figure 2:
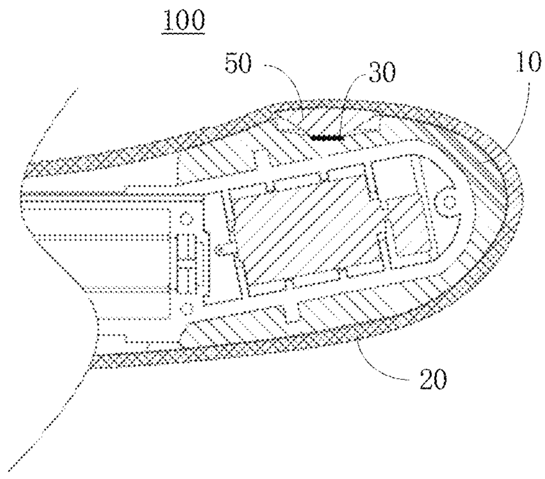
FIG. 2 is a schematic diagram of a partial structure of a first massage device according to an embodiment of the present disclosure.
Figure 3:
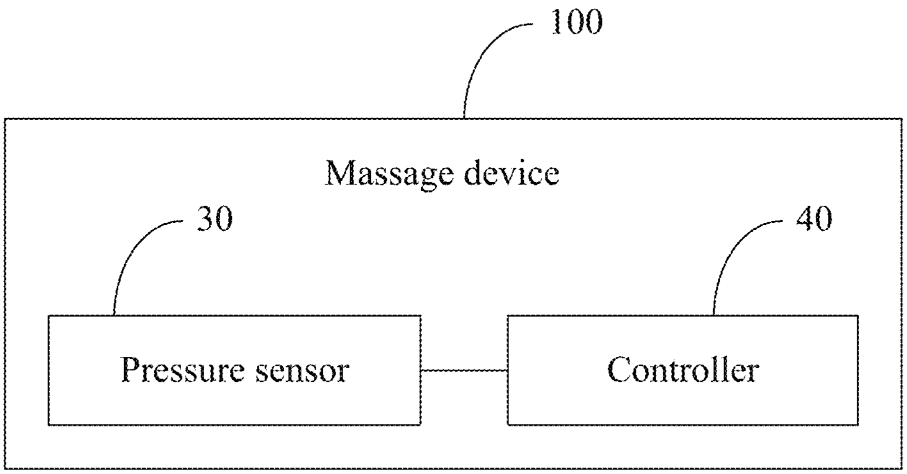
FIG. 3 is a schematic diagram of a connection of a massage device according to an embodiment of the present disclosure.

In view of the above problems, the present disclosure provides the following embodiments:

With reference to FIGS. 1-3, this embodiment provides a massage device 100, which includes a main body 10, a silicone layer 20, a pressure sensor 30, a controller 40, and a support member 50.

Specifically, the main body 10 is a rigid structure, and the controller 40 is disposed inside the main body 10. For example, the main body 10 may specifically a rigid plastic structure.

The silicone layer 20 is wrapped around an outer layer of the main body 10. When the massage device100 is used, the silicone layer 20 is usually in direct contact with a human body and is configured to increase the comfort of the massage device 100 during operation.

The pressure sensor 30 is disposed between the silicone layer 20 and the main body 10, and is attached to a first end portion of the main body 10. The first end portion of the main body 10 functions as a massage end of the massage device 100. In this embodiment, the main body 10 includes a first end portion and a second end portion that are arranged opposite each other, the first end portion primarily functions as a massage end of the massage device 100, which mainly provides massage vibration or similar functions, while the second end portion may function as a handheld end for the user.

In addition, the pressure sensor 30 is electrically connected to the controller 40, and the pressure sensor 30 is configured to transmit a detected pressure signal to the controller 40.

In this embodiment, a support member 50 is additionally arranged in the massage device 100. The support member 50 is disposed between the silicone layer 20 and the pressure sensor 30, the support member 50 includes a first end surface and a second end surface that are arranged opposite each other, an area of the first end surface is larger than an area of the second end surface, the first end surface is in close contact with the silicone layer 20, and the second end surface is in close contact with the pressure sensor 30. The support member 50 is configured to transmit a pressure.

In other words, in this embodiment, the support member 50 includes two end surfaces with different areas, that is, a first end surface and a second end surface; the first end surface having a large area is in attached to the silicone layer 20, while the second end surface having a small area is attached to the pressure sensor 30.

When the massage device 100 is in actual use, since a support member 50 having different areas at both ends is disposed between the silicone layer 20 and the pressure sensor 30, pressure transmission can be optimized through the support member 50, that is, the large-area end surface (first end surface) of the support member 50 is in direct contact with the human body and transmits pressure force to the small-area end surface (second end surface) that is attached to the pressure sensor 30, such that the pressure sensor 30 can detect the pressure force over a larger area.

Considering that a pressure sensor arranged in the existing massager can only detect the pressure value of a fixed area, resulting in a limited responsive area. Moreover, when the massager is used by different users, there may be deviations between the contact end of the massager and an actual contact region of the human body, which may lead to different responses of the pressure sensor, causing different control responses of the massager to the different users, and affecting the user's interaction experience. Specifically, from the perspective of massager manufacturers, pressure sensors are usually positioned at fixed locations based on vibration characteristics of the massagers. However, different users have different feeling and comfort levels for vibration massage, the fixed locations may be suitable for most users, but a small number of users may have a deviation of 0.5 cm-2 cm from an ideal area, which in turn results in a deviation in response of the pressure sensors, and limits the ability of the massager to deliver precise control tailored to individual users. Therefore, this embodiment provides a massage device 100, where a support member 50 having different areas at both ends is disposed between the silicone layer 20 and the pressure sensor 30 of the massage device, the first end surface having a large area is in attached to the silicone layer 20, and the second end surface having a small area is attached to the pressure sensor 30, such that a physical response area of the pressure sensor 30 is increased, and the pressure sensor 30 can detect pressure applied over a larger area under the mechanical action of the support member 50, thereby solving the problem of control deviation problem caused by the use deviation of a small number of users in the current massager design, that is, from the perspective of physical contact and response coverage, the configuration in this embodiment increases the pressure contact response area.

It can be seen that the massage device 100 provided by this embodiment can enhance the interactive response of the pressure sensor 30 and improve the user experience.

In one embodiment, the support member 50 may be a rigid support member.

The rigid support member may be made of, but is not limited to, plastic materials such as acrylonitrile butadiene styrene (ABS) plastic or polycarbonate (PC) plastic. The rigid support member may also be made of metal materials such as aluminum alloy.

It should be noted that the rigid support member has a better pressure transmission efficiency.

In another embodiment, the support member 50 may be an elastic support member.

The elastic support member may include, but is not limited to, silicone rubber, synthetic rubber, and the like.

In this embodiment, the elastic support member may be made of a composite material. For example, the elastic support member may include a silicone matrix, and a metal mesh or a spring disposed inside the silicone matrix.

It should be noted that the elastic support member can absorb a portion of the external force energy, such that the pressure sensor 30 can operate with an expanded detection and response range.

In additionally, the support member 50 may also be a composite structure. For example, the first end surface of the support member 50 may be made of silicone, while the second end surface of the support member 50 may be made of plastic, such that the support member 50 is capable of both absorbing part of the external force, the detection and response range of the pressure sensor 30 are accordingly expanded, and the pressure transmission efficiency is improved.

Optionally, an area ratio of the first end surface to the second end surface is denoted as K, where K has a value range of 2-8.

Specifically, when an area of the first end surface of the support member 50 is denoted as S1, and an area of the second end surface of the support member 50 is denoted as S2, then K=S1/S2, that is, a ratio of the area of the first end surface S1 of the support member 50 to the area of the second end surface S2 of the support member 50. A range of the ratio K is 2-8.

Specifically, the ratio may be 2, 4, or 8, or any other value within this range.

It should be noted that selecting the area ratio of the first end surface to the second end surface at 2-8 takes into account both the supporting stability of the support member 50 inside the massage device 100 and the effectiveness of sensor response.

Further, the value of K may be different based on specific application of the massage device 100. For example, when the massage device 100 is an ordinary household massager, the area ratio K of the first end surface to the second end surface is set at 2-4, which gives priority to economy and durability. When the massage device 100 is a medical massager, the area ratio K of the first end surface to the second end surface is set at 3-7, so as to enhance the interactive responsiveness of the pressure sensor 30 and improve the accuracy of subsequent pressure feedback.

Optionally, in one embodiment, the pressure sensor 30 is a patch-type pressure sensor.

For example, in this embodiment, the patch-type pressure sensor may be specifically as a Micro Electro Mechanical Systems (MEMS) pressure sensor.

A shape of the second end surface is the same as a shape of an actual detection area of the patch-type pressure sensor. Moreover, the area of the second end surface is equal to an area of the actual detection area of the patch-type pressure sensor.

In other words, in this embodiment, the shape of the second end surface completely conforms to the actual detection area of the patch-type pressure sensor, that is, the second end surface completely covers a sensitive unit of the pressure sensor to achieve complete matching. This method can solve the problem of signal attenuation caused by edge suspension in the area, and the complete shape matching can also reduce energy loss.

Figure 4:
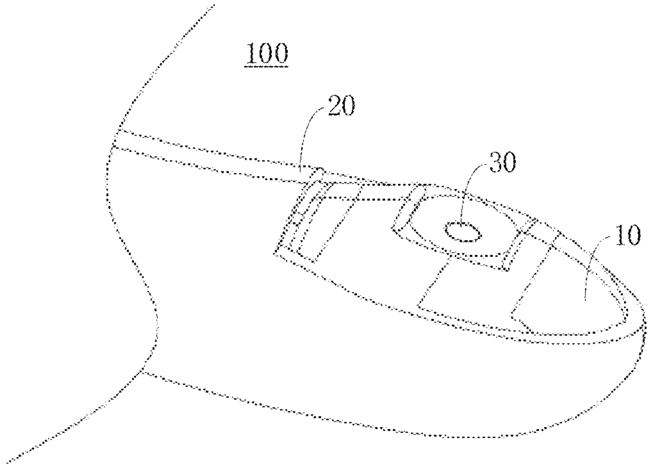
FIG. 4 is a schematic diagram of a partial structure of a second massage device according to an embodiment of the present disclosure.
Figure 5:
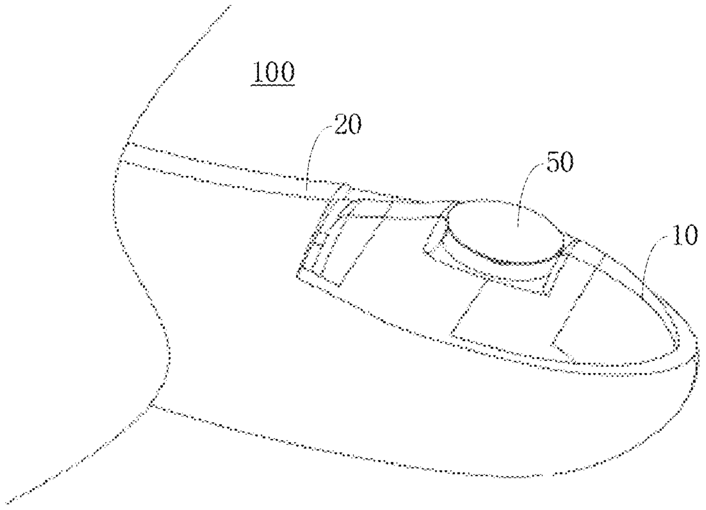
FIG. 5 is a schematic diagram of a partial structure of a third massage device according to an embodiment of the present disclosure.

With reference to FIGS. 4 and 5, when the pressure sensor 30 is a patch-type pressure sensor, a shape of the patch-type pressure sensor may be circular. Accordingly, the support member 50 has a truncated cone structure, that is, the first end surface and the second end surface of the support member 50 are both circular.

that is, in this embodiment, a shape of the second end surface is the same as a shape of an actual detection area of the patch-type pressure sensor, the area of the second end surface is equal to an area of the actual detection area of the patch-type pressure sensor, and the second end surface and the patch-type pressure sensor are both circular in shape.

It should be noted that, in this embodiment, a circular patch-type pressure sensor is used, and the corresponding support member 50 has a truncated cone structure, this configuration offers significant advantages in mechanical force transmission. Specifically, axial symmetry of the truncated cone structure can evenly transmit pressure in various directions. For example, some users are accustomed to using the massage device 100 at an angled orientation (with an angle deviation from an ideal vertical direction), in which case, the above configuration still enables effective detection and responsive control.

Figure 6:
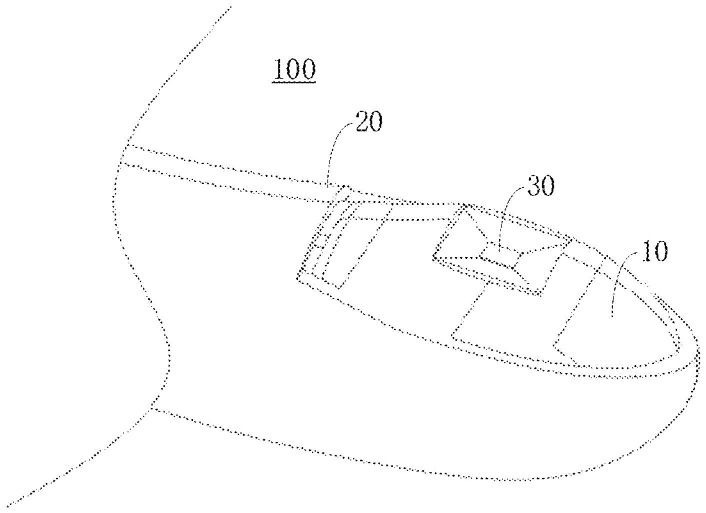
FIG. 6 is a schematic diagram of a partial structure of a fourth massage device according to an embodiment of the present disclosure.
Figure 7:
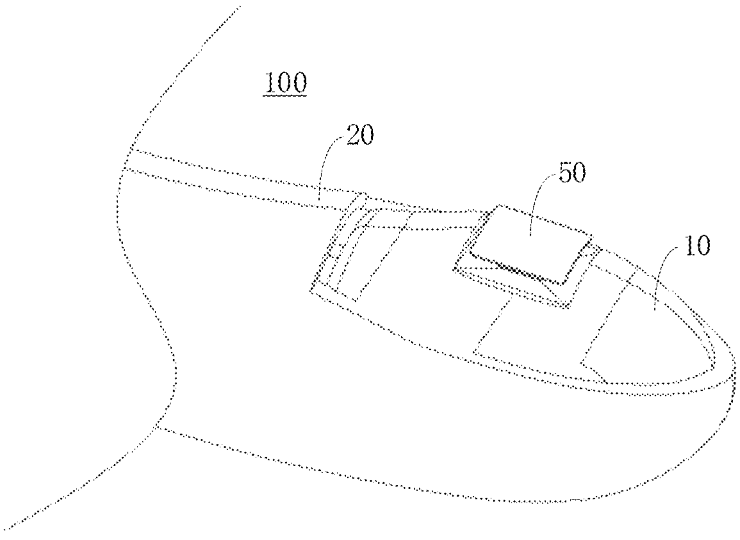
FIG. 7 is a schematic diagram of a partial structure of a fifth massage device according to an embodiment of the present disclosure.

With reference to FIGS. 6 and 7, when the pressure sensor 30 is a patch-type pressure sensor, a shape of the patch-type pressure sensor may be a quadrilateral. Correspondingly, the structure of the support member 50 has a truncated pyramid structure, that is, the first end surface and the second end surface of the support member 50 are both quadrilateral.

that is, in this embodiment, a shape of the second end surface is the same as a shape of an actual detection area of the patch-type pressure sensor, the area of the second end surface is equal to an area of the actual detection area of the patch-type pressure sensor, and the second end surface and the patch-type pressure sensor are both quadrilateral.

It should be noted that, in this embodiment, a quadrilateral patch-type pressure sensor is used, and the corresponding support member 50 has a truncated pyramid structure, this configuration offers significant advantages in mechanical force transmission, which is specifically manifested in stronger directional perception ability and more sensitive to pressure applied along a longer edge.

In addition, in other embodiments, the pressure sensor 30 and the support member 50 may be arranged in other matched shapes in other matched shapes, which is not limited in the present disclosure.

Optionally, in one embodiment, a number of the pressure sensors 30 and a number of the support members 50 are both N, where N is a positive integer; and each pressure sensor 30 corresponds to one corresponding support member 50.

That is, the massage device 100 is provided with N pairs of pressure detection units, and each pair of pressure detection units includes one pressure sensor 30 and one support member 50. For example, N may be 2, 3, 4, and the like.

Figure 8:
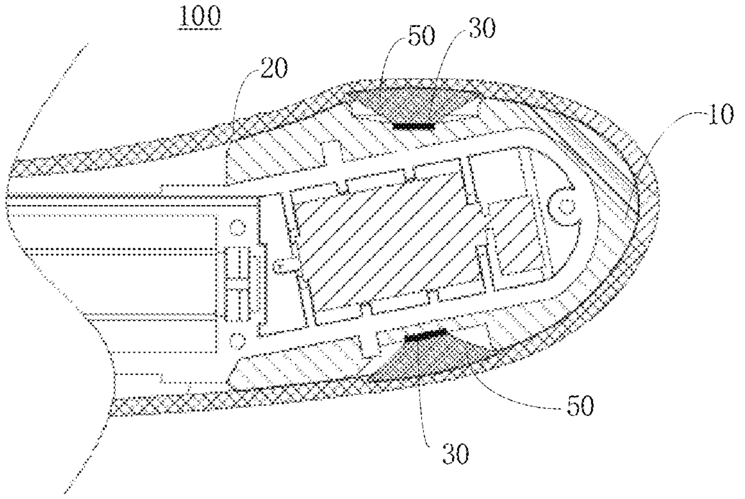
FIG. 8 is a schematic diagram of a partial structure of a sixth massage device according to an embodiment of the present disclosure.

A shown in FIG. 8, N is 2, the massage device 100 includes two pressure sensors 30 and two support members 50. That is, the two pairs of pressure detection units are respectively arranged on opposite sides of the massage device 100. That is, the two pairs of pressure detection units can realize effective detection of upper and lower sides as shown in the figure (some users are accustomed to using the massage device 100 in a reversed direction).

In other words, in this embodiment, by arranging N pressure sensors 30 and a matching number of support members 50 on the massage device 100, single-point detection can be upgraded to multi-point detection, that is, pressure from multiple locations on the massage end of the massage device 100 can be detected, which can be adapted to use needs of different users. Furthermore, the multi-point detection can also provide the user with other functions, such as recognizing massage actions, in the subsequent process.

Optionally, the N pressure sensors 30 are distributed in an axisymmetric manner at the first end portion of the main body 10, such that the N support members 50 are brought into sequential contact.

In other words, the N pressure sensors 30 are distributed in an axially symmetrical configuration at the first end portion of the main body 10, and the corresponding N support members 50 are distributed in a ring shape at the first end portion, such that all-around pressure detection can be achieved.

In addition, this method facilitates the calculation of a total pressure applied to the massage end of the massage device 100. For example, when the massage end is inserted into the human body, an overall pressure of the massage end can be effectively detected, thereby facilitating more precise pressure adjustment and control in subsequent operations.

Figure 9:
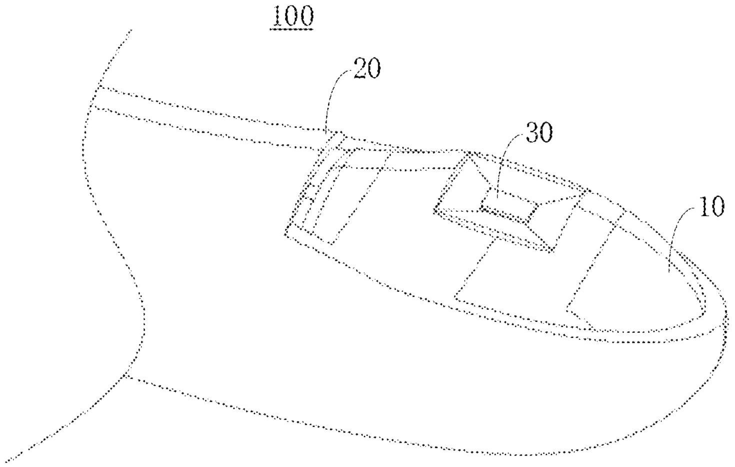
FIG. 9 is a schematic diagram of a partial structure of a seventh massage device according to an embodiment of the present disclosure.
Figure 10:
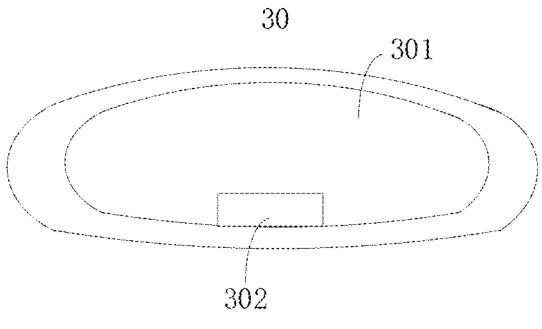
FIG. 10 is a schematic plan view of a first airbag-type pressure sensor according to an embodiment of the present disclosure.

With reference to FIGS. 9 and 10, this embodiment further provides a massage device 100. The pressure sensor 30 provided therein is an airbag-type pressure sensor.

The airbag-type pressure sensor includes a sealed airbag 301, and an air pressure sensor 302 disposed within the sealed airbag.

The air pressure sensor 302 is electrically connected to the controller 40.

Figure 12:
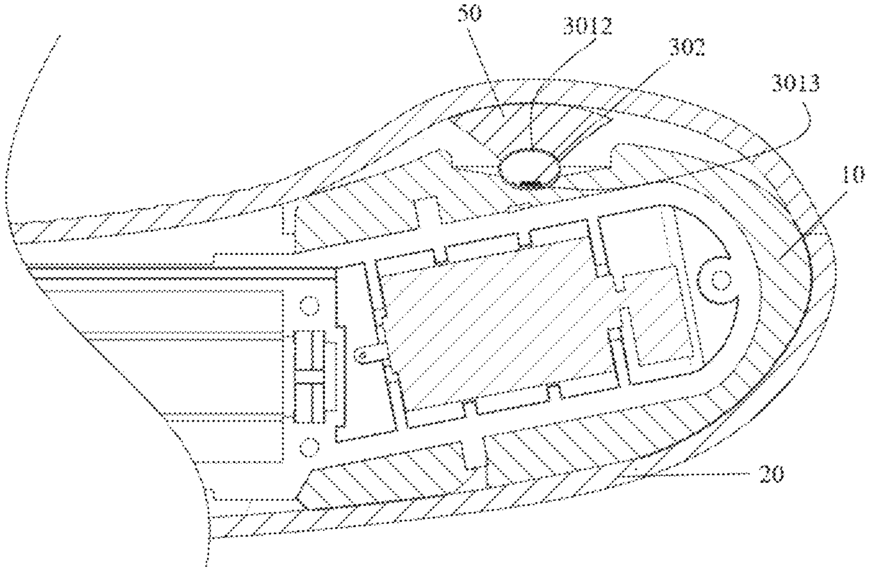
FIG. 12 is a schematic diagram of a partial structure of a massage device including a sealed airbag and an air pressure sensor according to an embodiment of the present disclosure.

Specifically, as shown in FIG. 12, the sealed airbag 301 includes a flexible contact end 3012 and a fixed end 3013; and the flexible contact end 3012 is connected to the support member 50, and the fixed end 3013 is configured to be fixed to the first end portion of the main body 10.

It should be noted that the airbag-type pressure sensor may be installed at any position where pressure sensing is required, thereby enlarging a design space of the product, and the airbag structure provides a more comfortable tactile experience when in contact with the human body. In addition, the airbag-type pressure sensor is capable of absorbing a portion of the external force, thereby expanding the detection response range compared with the ordinary pressure sensors. In other words, unlike traditional pressure sensors where a sensitive element will not give any displacement response (that is, without producing any concession) when being subjected to external force, while the airbag-type pressure sensor can absorb part of the external force energy (which is similar to the principle of the support member 50), such that the response range of the pressure sensor 30 can be significantly improved.

Therefore, in this embodiment, the response range can be enhanced not only by incorporating the support member 50, but also by providing the pressure sensor 30 as an airbag-type pressure sensor, thereby providing a massage product with a larger response range and a more interactive feeling. In addition, since an air pressure inside the airbag is uniformly distributed, the airbag exhibits the same response characteristics to pressures from all directions. Therefore, the airbag-type pressure sensor is arranged in the massage device 100, so as to further improve the interactive response experience and product quality of the contact-type massager.

Figure 11:
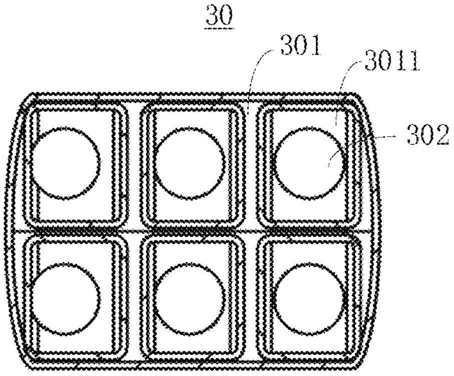
FIG. 11 is a schematic plan view of a second airbag-type pressure sensor according to an embodiment of the present disclosure.

With reference to FIG. 11, the sealed airbag 301 includes M sub-chambers 3011, and a number of the air pressure sensors 302 is also M, where M is a positive integer.

As shown in FIG. 11, M may be 6; of course, M can also be 4, 8, and the like, which is not limited in the present disclosure.

Each sub-chamber 3011 is provided with one air pressure sensor 302, and each air pressure sensor 302 is connected to the controller 40.

It should be noted that in this embodiment, each sub-chamber 3011 is capable of independently detecting localized pressure, thereby achieving high-resolution pressure distribution detection. As shown in FIG. 11, the sealed airbag 301 may be divided into six detection regions, such that each detection region can correspond to and monitor a respective area. Independent pressure detection in each detection region facilitates the identification or tracking of use actions of the user. For example, when the massage end of the massage device 100 is inserted into the human body, detecting pressure value in individual sub-chamber located in a fixed region can assist in detecting the user's use actions or behaviors during massage operation.

Optionally, the M sub-chambers 3011 may be arranged in an array.

It should be noted that arranging the M sub-chambers 3011 in an array can further improve a spatial resolution.

Optionally, the sealed airbag 301 may include M sub-chambers 3011; and the M sub-chambers 3011 are communicated with one another, where M is a positive integer.

That is, in this embodiment, the sealed airbag 301 with a plurality of the sub-chambers 3011 that are communicated with one another is provided. For the intercommunicated sealed airbag 301, only one air pressure sensor 302 may be provided. The air pressure sensor 302 may be disposed in any one of the sub-chambers 3011.

The intercommunicated M sub-chambers 3011 allow for uniform force distribution and maintain balanced air pressure. In addition, only a single air pressure sensor 302 can reduce the cost.

In summary, the massage device 100 provided in the embodiments of the present disclosure has the following beneficial effects:

First, considering that a pressure sensor arranged in the existing massager can only detect the pressure value of a fixed area, resulting in a limited responsive area. Moreover, when the massager is used by different users, there may be deviations between the contact end of the massager and an actual contact region of the human body, which may lead to different responses of the pressure sensor, causing different control responses of the massager to the different users, and affecting the user's interaction experience. Specifically, from the perspective of massager manufacturers, pressure sensors are usually positioned at fixed locations based on vibration characteristics of the massagers. However, different users have different feeling and comfort levels for vibration massage, the fixed locations may be suitable for most users, but a small number of users may have a deviation of 0.5 cm-2 cm from an ideal area, which in turn results in a deviation in response of the pressure sensors, and limits the ability of the massager to deliver precise control tailored to individual users. Therefore, this embodiment provides a massage device 100, where a support member 50 having different areas at both ends is disposed between the silicone layer 20 and the pressure sensor 30 of the massage device, the first end surface having a large area is in attached to the silicone layer 20, and the second end surface having a small area is attached to the pressure sensor 30, such that a physical response area of the pressure sensor 30 is increased, and the pressure sensor 30 can detect pressure applied over a larger area under the mechanical action of the support member 50, thereby solving the problem of control deviation problem caused by the use deviation of a small number of users in the current massager design, that is, from the perspective of physical contact and response coverage, the configuration in this embodiment increases the pressure contact response area. From the perspective of pressure detection values, since the support member 50 can absorb a portion of the external force energy, such that the pressure sensor 30 can operate with an expanded detection and response range. It can be seen that the massage device 100 provided by this embodiment can enhance the interactive response of the pressure sensor 30 and improve the user experience.

Second, considering the traditional pressure sensors, the sensitive element thereof will not give any displacement response (that is, without producing any concession) when being subjected to external force, resulting in a relatively small response range. Therefore, in some embodiments of the present disclosure, an airbag-type pressure sensor is provided. The airbag-type pressure sensor may be installed at any position where pressure sensing is required, thereby enlarging a design space of the product, and the airbag structure provides a more comfortable tactile experience when in contact with the human body. In addition, the airbag-type pressure sensor is capable of absorbing a portion of the external force, thereby expanding the detection response range compared with the ordinary pressure sensors.

Therefore, in this embodiment, the response range can be enhanced not only by incorporating the support member 50, but also by providing the pressure sensor 30 as an airbag-type pressure sensor, thereby providing a massage product with a larger response range and a more interactive feeling. In addition, since an air pressure inside the airbag is uniformly distributed, the airbag exhibits the same response characteristics to pressures from all directions. Therefore, the airbag-type pressure sensor is arranged in the massage device 100, so as to further improve the interactive response experience and product quality of the contact-type massager.

In addition, in the description of the specification and the appended claims of the present disclosure, the terms "first", "second", "third", etc. are merely for distinguish between descriptions and may not be understood as indication or implication of relative importance.

Reference in the description of the present disclosure to "an example" or "some examples", etc. means that one or more examples of the present disclosure include particular features, structures or characteristics described in combination with the examples. Accordingly, phrases such as "in one embodiment," "in some embodiments," "in other embodiments," and "in further embodiments," appearing in difference parts in the specification do not necessarily refer to the same embodiment, but rather mean "one or more but not all of the embodiments," unless specifically emphasized otherwise. The terms "include", "comprise", "have", and their variations mean "including but not limited to" or "comprising but not limited to", unless specifically emphasized otherwise.

In the description of the embodiments of the present disclosure, it should be understood that the terms "upper", "lower", "front", "back", "left", "right", "vertical", "horizontal", "central", "top", "bottom", "top surface", "bottom surface", "inner", "outer", "inside", "outside" and other indicated orientations or positional relationships are based on orientation or position relations shown in the accompanying drawings.

In the description of the embodiments of the present disclosure, it should be noted that, unless otherwise explicitly specified and defined, the terms "mounting", "connecting", "connection" and "assembly" should be understood in a broad sense, for example, they may be a fixed connection, a detachable connection, or an integrated connection; and may be a direct connection, or an indirect connection via an intermediate medium, or communication inside two elements. For those of ordinarily skilled in the art, specific meanings of the above terms in the present disclosure could be understood according to specific circumstances.

In the description of the embodiments of the present disclosure, specific feature, structure, material or characteristics described may be combined in a suitable manner in any one or more embodiments or examples.

In the description of the embodiments of the present disclosure, it should be understood that that "-" and "~" represent the same range of two numerical values, and the range includes end values thereof, for example, "A-B" means a range greater than or equaling to A and less than or equaling to B. "A~B" means a range greater than or equaling to A and less than or equaling to B.

In the description of the embodiments of the present disclosure, the term "and/or" represents merely an association relationship describing associated objects, indicating that there may be three types of relationships, for example, A and/or B, which means three types of situation, that is, the existence of A alone, the existence of both A and B, and the existence of B alone. In addition, the character "/" herein generally indicates that the associated objects are in an "or" relationship.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

What is claimed is:

1. A massage device, comprising:

a main body, wherein the main body is a rigid structure, and a controller is disposed inside the main body;

a silicone layer, wherein the silicone layer is wrapped around an outer layer of the main body;

a pressure sensor, wherein the pressure sensor is disposed between the silicone layer and the main body, and is attached to a first end portion of the main body; the first end portion of the main body functions as a massage end of the massage device; and the pressure sensor is connected to the controller; and a support member disposed between the silicone layer and the pressure sensor, wherein the support member comprises a first end surface and a second end surface that are arranged opposite each other, an area of the first end surface is larger than an area of the second end surface, the first end surface is in close contact with the silicone layer, the second end surface is in close contact with the pressure sensor, the support member is a composite structure, the first end surface is made of silicone, the second end surface is made of plastic, an area ratio K of the first end surface to the second end surface is in a value range of 2-8, and the support member is configured to increase a physical response area of the pressure sensor.

2. The massage device according to claim 1, wherein the K has a value range of 2-4.

3. The massage device according to claim 1, wherein the K has a value range of 3-7.

4. The massage device according to claim 1, wherein the support member has a truncated cone structure; and the first end surface and the second end surface are both circular.

5. The massage device according to claim 1, wherein the support member has a truncated pyramid structure; and the first end surface and the second end surface are both quadrilateral.

6. The massage device according to claim 1, wherein the pressure sensor is a patch-type pressure sensor.

7. The massage device according to claim 6, wherein a shape of the second end surface is the same as a shape of an actual detection area of the patch-type pressure sensor.

8. The massage device according to claim 7, wherein the area of the second end surface is equal to an area of the actual detection area of the patch-type pressure sensor.

9. The massage device according to claim 1, wherein a number of the pressure sensors and a number of the support members are N, respectively, wherein N is a positive integer; and each pressure sensor corresponds to one support member.

10. The massage device according to claim 9, wherein the N pressure sensors are distributed in an axisymmetric manner at the first end portion of the main body.

11. The massage device according to claim 9, wherein a value of the N is 2.

12. The massage device according to claim 1, wherein the pressure sensor is an airbag-type pressure sensor; wherein the airbag-type pressure sensor comprises a sealed airbag, and an air pressure sensor disposed within the sealed airbag; and the air pressure sensor is connected to the controller.

13. The massage device according to claim 12, wherein the sealed airbag comprises a flexible contact end and a fixed end; wherein the flexible contact end is connected to the support member, and the fixed end is configured to be fixed to the first end portion of the main body.

14. The massage device according to claim 12, wherein the sealed airbag comprises M sub-chambers, and a number of the air pressure sensors is also M; wherein M is a positive integer; and each sub-chamber is provided with one air pressure sensor, and each air pressure sensor is connected to the controller.

15. The massage device according to claim 14, wherein the M sub-chambers are arranged in an array.

16. The massage device according to claim 12, wherein the sealed airbag comprises M sub-chambers; and the M sub-chambers are communicated with one another, wherein M is a positive integer.

17. The massage device according to claim 16, wherein a value of the M is 6.

* * * * *